US008285496B2

(12) United States Patent
Heinkele et al.

(10) Patent No.: US 8,285,496 B2
(45) Date of Patent: Oct. 9, 2012

(54) METHOD AND DEVICE FOR PROVIDING AIR MASS FLOW INFORMATION IN A SUPERCHARGED INTERNAL COMBUSTION ENGINE

(75) Inventors: Matthias Heinkele, Weil der Stadt (DE); Patrick Menold, Stuttgart (DE); Michael Drung, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 12/589,265

(22) Filed: Oct. 20, 2009

(65) Prior Publication Data

US 2010/0131212 A1 May 27, 2010

(30) Foreign Application Priority Data

Nov. 21, 2008 (DE) ......................... 10 2008 043 975

(51) Int. Cl.
*G01M 15/04* (2006.01)

(52) U.S. Cl. ............ 702/47; 702/30; 702/104; 701/102; 73/142.26; 73/114.33; 73/114.79

(58) Field of Classification Search .................... 702/30, 702/47, 104; 701/102; 73/114.26, 114.33, 73/114.79

See application file for complete search history.

(56) References Cited

U.S. PATENT DOCUMENTS

| | | | | |
|---|---|---|---|---|
| 7,661,298 | B2 * | 2/2010 | Hartmann et al. | 73/114.79 |
| 2004/0153780 | A1 * | 8/2004 | Strohrmann et al. | 714/25 |
| 2008/0229817 | A1 * | 9/2008 | Hartmann et al. | 73/114.79 |
| 2009/0024297 | A1 * | 1/2009 | Erol | 701/102 |
| 2009/0105965 | A1 * | 4/2009 | Birk et al. | 702/30 |

* cited by examiner

*Primary Examiner* — Carol Tsai

(74) *Attorney, Agent, or Firm* — Kenyon & Kenyon LLP

(57) ABSTRACT

A method for providing a characteristic quantity for a state of an air system of a supercharged internal combustion engine includes: detecting a characteristic quantity measured value as characteristic quantity information with the aid of a sensor; providing a characteristic quantity model, using which a characteristic quantity model value is computed on the basis of one or more quantities different from the characteristic quantity measured value; and providing the characteristic quantity either based on the characteristic quantity measured value or on the characteristic quantity model value computed by the characteristic quantity model, as a function of a state of the air system.

6 Claims, 2 Drawing Sheets

METHOD AND DEVICE FOR PROVIDING AIR MASS FLOW INFORMATION IN A SUPERCHARGED INTERNAL COMBUSTION ENGINE

BACKGROUND INFORMATION

1. Field of the Invention

The present invention relates to supercharged internal combustion engines in which a supplied air mass flow is measured with the aid of an air mass flow sensor in the air system to determine the air charge of cylinders of the internal combustion engine.

2. Description of Related Art

To detect the air charge of an internal combustion engine, an air mass flow sensor, e.g., in the form of a hot-film air mass meter, which is situated at the intake of the air system, is normally used. The air mass flow aspirated for operating the internal combustion engine is measured with the aid of the air mass flow sensor and adjusted with the aid of a throttle valve in an intake manifold of the air system or of a controllable supercharger device. In the case of a throttle valve provided in the air system, it is assumed that the air mass flowing through the throttle valve in the air system of the internal combustion engine corresponds to the air quantity aspirated on the intake side. In supercharged internal combustion engines the air is aspirated with the aid of a supercharger device, which is designed, for example, in the form of a turbocharger operated by exhaust gas power to provide a boost pressure upstream from the throttle valve.

Accurately knowing the air mass flows in the air system is essential for properly controlling the internal combustion engine. However, at certain operating points, the measurement of the air mass flow by the air mass flow sensor may be subject to interference. Such operating points are, for example, operating points at which a high boost pressure occurs and little air mass is transported by the compressor. Such operating points occur in particular in the case of a rapid load change from a high to a low load, i.e., when the throttle valve is moved rapidly in its closing direction. So-called compressor pumping may then occur where powerful pressure fluctuations of the air pressure are generated downstream from the compressor of the supercharger device. The reasons for compressor pumping include flow separation at the vanes of the supercharger device's compressor. The pressure fluctuations of the boost pressure also have a negative effect on the air mass flow sensor, so that the measured values detected thereby are highly inaccurate in these operating ranges. For this reason, a substitute value for the air mass flow is provided instead.

In a pneumatic ambient air-pulsed valve, i.e., the ambient air-pulsed valve is not electrically controlled, but only as a function of the pressure differential between the intake manifold pressure and the ambient pressure, the air may also flow back via the air mass flow sensor by flowing from the discharge side of the compressor to the intake side. However, due to its design, the air mass flow sensor is not suitable for detecting a reverse air mass flow with sufficient accuracy. Also in this case, it is better to use a substitute value for the air mass flow.

The substitute value for the air mass flow corresponds, for example, to the air mass flow through the throttle valve, which may be calculated with the aid of a conventional model of the throttle valve and the modeled and/or measured pressures upstream and downstream from the throttle valve. During regular operation of the internal combustion engine, i.e., when the above-mentioned operating point does not exist, the measured value of the air mass flow sensor is used and, at the same time, the model of the throttle valve, which is used for ascertaining the substitute value, is adapted in the known manner. If it is now established that the measured value of the air mass flow sensor should no longer be evaluated because of certain operating states, the ascertained substitute value is used.

Alternatively, for example, in air systems without a throttle valve, the substitute value for the air mass flow may be ascertained via a model on the basis of the intake manifold pressure and the rotational speed.

In supercharged internal combustion engines having an electrically controlled ambient air-pulsed valve in an ambient air-pulsed pipe, which connects the intake side to the discharge side of the compressor of the supercharger device, the use of the substitute value may be made to depend on the activation of the ambient air-pulsed valve. This is, however, impossible in the case of an engine system in which the ambient air-pulsed valve is pneumatically controlled, since no corresponding signal is available.

There are also engine systems in which no ambient air-pulsed pipe bridging the compressor is provided. In this case as well, no control signal for an ambient air-pulsed valve is provided, so that other criteria for the use of the substitute value for the air mass flow instead of the measured mass flow must be used.

BRIEF SUMMARY OF THE INVENTION

An object of the present invention is to provide a method and a device in which, for a supercharged internal combustion engine, in particular for an internal combustion engine without an electrically controllable ambient air-pulsed valve, it is determined when a measured characteristic quantity, such as the air mass flow, and when a characteristic quantity model value, such as a substitute value for the air mass flow, is used.

According to the present invention, a method is provided for making available a characteristic quantity for a state of an air system of a supercharged internal combustion engine. The method includes the following steps:

- detecting a characteristic quantity measured value as characteristic quantity information with the aid of a sensor;
- providing a characteristic quantity model, using which a characteristic quantity model value may be calculated on the basis of one or more quantities different from the characteristic quantity measured value;
- providing the characteristic quantity either based on the characteristic quantity measured value or on the characteristic quantity model value calculated by the characteristic quantity model, as a function of a state of the air system.

One idea for the above procedure is not to use a measured value of a characteristic quantity, in particular of an air mass flow in the air system, if the characteristic quantity measured value might be interfered with due to an unfavorable operating state. It is thus prevented that the use of an erroneous characteristic quantity measured value for the control of the internal combustion engine results in erroneous operation or in an unfavorable operating point, for example, in a reduction of the torque output or in an increase in undesirable emissions. Furthermore, the characteristic quantity model value which models the characteristic quantity on the basis of other quantities is used only as long as the operating state requires the use of the model value, since the latter is usually less accurate than the characteristic quantity measured value.

The modeled air mass flow is used for the substitute value of the air mass flow instead of the measured value in the event of compressor pumping, for example, similarly by modeling the sum of the mass flows through the supercharger device; compressor pumping may be detected when this mass flow periodically drops below a threshold. This may be detected, for example, with the aid of a pressure gradient of the charge air pressure. Without modeling the mass flows, a pressure gradient reversal would be needed for detecting compressor pumping.

Furthermore, as a function of the state of the air system, the characteristic quantity model may be adapted as a function of the characteristic quantity measured value.

According to one example embodiment, one or more of the quantities different from the characteristic quantity measured value may include another measured quantity or another modeled quantity.

Furthermore, the characteristic quantity may represent an air mass flow in the air system. An air mass flow measured value may be detected by an air mass flow sensor as a characteristic quantity measured value, the characteristic quantity model including an air mass flow model, and the air mass flow being provided on the basis of the air mass flow measured value or on the basis of the air mass flow model value, as a function of a state of the air system.

The air system may have a throttle valve downstream from a compressor of a supercharger device, the air mass flow model ascertaining the air mass flow through the compressor as the air mass flow to be provided on the basis of an air mass flow through the throttle valve, taking into account the dynamic behavior of a volume between the compressor and the throttle valve.

Alternatively, the air mass flow model, in particular in an air system without a throttle valve, may ascertain the air mass flow on the basis of the pressure in an intake manifold of the internal combustion engine and of the rotational speed of the internal combustion engine.

In particular, the air mass flow through the throttle valve may be ascertained on the basis of a state of the throttle valve and a pressure differential across the throttle valve on the basis of a throttle equation, the behavior of the volume being taken into account with the aid of the ideal gas equation.

The state of the air system may correspond to a state in which a probability for erroneous detection of the air mass flow measured value exceeds a limiting value.

According to one example embodiment, the air mass flow model value may be provided instead of the air mass flow measured value if pulsations of the air mass flow through the compressor and/or of a pressure in the air system occur. In particular, the air mass flow model value may be provided instead of the air mass flow measured value if the throttle valve is closed at a gradient exceeding a threshold value and/or if the air mass flow measured value drops below a certain threshold value.

According to a further aspect of the present invention, a method for operating an internal combustion engine is provided in which a characteristic quantity is provided according to the above-described method, control signals for the internal combustion engine being provided, which are generated as a function of the characteristic quantity.

According to another aspect of the present invention, a device is provided for providing a characteristic quantity for a state of an air system of a supercharged internal combustion engine. The device includes:

- a sensor for detecting a characteristic quantity measured value as characteristic quantity information;
- a computing unit in which a characteristic quantity model is implemented using which a characteristic quantity model value may be computed on the basis of one or more quantities that are different from the characteristic quantity measured value, the computing unit being designed for providing the characteristic quantity on the basis of the characteristic quantity measured value or on the basis of the characteristic quantity model value computed by the characteristic quantity model as a function of a state of the air system.

Furthermore, the characteristic quantity may represent an air mass flow in the air system, the sensor including an air mass flow sensor for detecting an air mass flow measured value as the characteristic quantity measured value, the computing unit being designed for providing an air mass flow model as the characteristic quantity model and for providing the air mass flow as a function of a state of the air system either based on the air mass flow measured value or based on the air mass flow model value computed by the air mass flow model.

According to another aspect of the present invention, an engine system is provided having the above-described device and having an internal combustion engine to which air is supplied via the air system.

Furthermore, the air system may have a throttle valve downstream from a compressor of a supercharger device, the computing unit being designed for ascertaining the air mass flow model on the basis of an air mass flow through the throttle valve, taking into account the dynamic behavior of a volume between the compressor and the throttle valve.

According to another aspect of the present invention, a computer program is provided, which contains a program code which carries out the above-described method when it is run on a data processing unit.

DETAILED DESCRIPTION OF THE INVENTION

Figure 1:
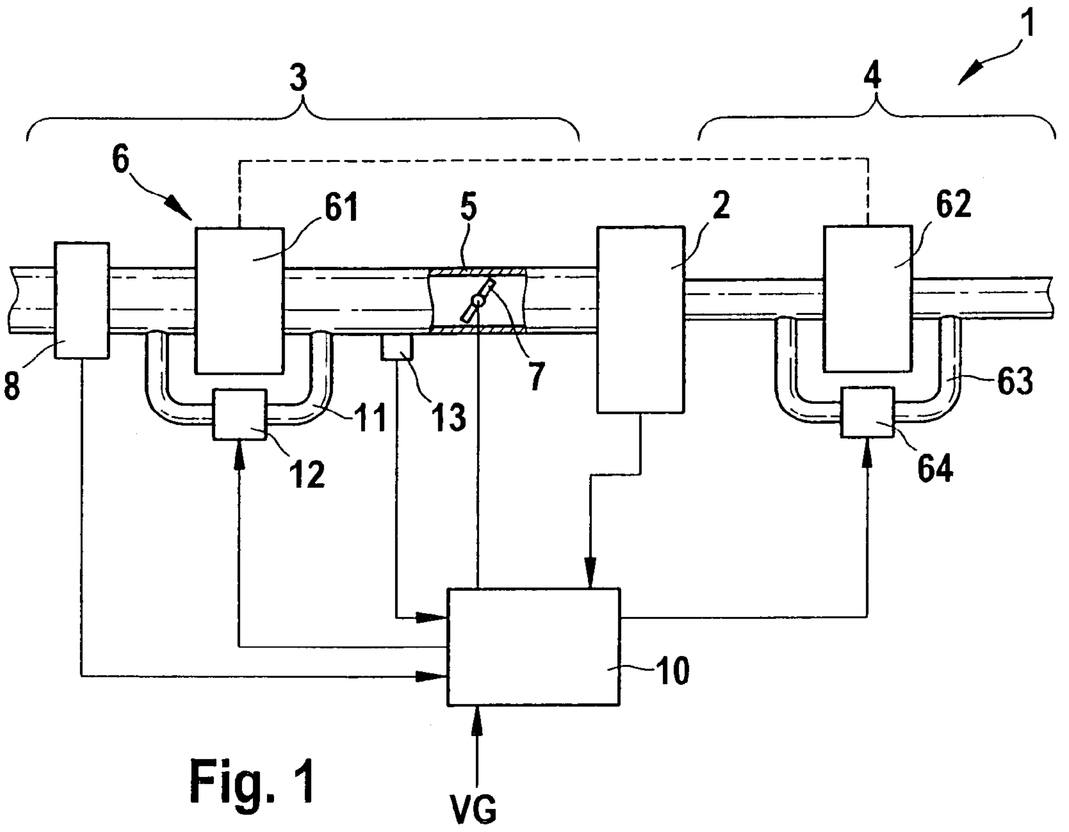
FIG. 1 shows a schematic illustration of an engine system having a supercharger device.

In the following description of the example embodiments, elements provided with the same reference numerals indicate elements of identical or comparable functions.

FIG. 1 shows an engine system 1 having an internal combustion engine 2, to which air is supplied via an air supply section 3 and from which exhaust gas is discharged with the aid of an exhaust gas discharge section 4. Air supply section 3 includes a compressor 61 of a supercharger device, connected to an intake manifold 5, so that intake manifold 5 is situated between the discharge side of compressor 6 and an inlet side of internal combustion engine 2.

A throttle valve 7 which controls the air mass flow into internal combustion engine 2, is situated in intake manifold 5. On the inlet side of compressor 61 of supercharger device 6, an air mass flow sensor 8 is provided in the form of a hot-film air mass flow sensor (HFM), to detect the air mass flow in air supply section 3. To drive compressor 61 of supercharger device 6, an exhaust gas turbine unit 62, which is coupled to compressor 61 via a shaft or the like for transmitting the compressor power, is situated in exhaust gas discharge section 4.

To control the supercharging performance, exhaust gas turbine unit 62 is provided with a bypass line 63, which connects the inlet and outlet sides of exhaust gas turbine unit 62 and in which a control element 64 in the form of a control valve is situated. The control valve is adjustable essentially continuously for setting the quantity of exhaust gas not flowing through exhaust gas turbine unit 62. Control element 64, throttle valve 7 and the fuel quantity supplied to internal combustion engine 2, and, if necessary, firing points of ignition units (not shown) such as spark plugs are provided by an engine control unit 10, for example, in the form of control signals.

Engine control unit 10 executes a control and regulating algorithm, which controls internal combustion engine 2 using control quantities or control signals with the aid of input quantities such as, for example, the air mass flow into internal combustion engine 2, boost pressure upstream from throttle valve 7, and others, as well as with the aid of preset quantities VG such as, for example, a driver input torque and operating point quantities such as, for example, the rotational speed of internal combustion engine 2, to provide a desired output quantity such as, for example, a torque or a desired engine output.

Compressor 61 of supercharger device 6 is provided with an ambient air-pulsed pipe 11 in which an ambient air-pulsed valve 12 is situated. Ambient air-pulsed valve 12 is a switch valve, i.e., normally it may only be opened or closed. Depending on the design of the engine system, ambient air-pulsed valve 12 may be activated electrically by engine control unit 10 or mechanically, i.e., pneumatically, as a function of a pressure differential between intake manifold 5 and (downstream from throttle valve 7) and the ambient pressure. Electropneumatic ambient air-pulsed valves are also known, which are operated using a control pressure via a valve controlled by engine control unit 10.

With the aid of ambient air-pulsed valve 12, a function is implemented, which prevents so-called compressor pumping of compressor 61. Compressor pumping occurs if there is a low mass flow and a high pressure differential between the inlet side and the outlet side of compressor 61. This operating state is often caused by a rapid change in load from a high load to a low load, i.e., if throttle valve 7 is moved into its closing position, so that the air mass flow transported through intake manifold 5 is reduced and the boost pressure upstream from throttle valve 7 increases accordingly. Compressor pumping is therefore prevented by opening ambient air-pulsed valve 12 in these defined operating states in order to equalize the pressure between the outlet line of compressor 61 and the inlet line of compressor 61. Part of the compressor power of compressor 61 is thus used, while ambient air-pulsed valve 12 is being opened, for pumping air in a circle through ambient air-pulsed pipe 11 or to blow off air.

Depending on the operating state in which ambient air-pulsed valve 12 is opened, a brief back-flow of air through air mass flow sensor 8 into the surroundings may occur. Since the air mass flow sensor is usually not designed for ascertaining a reliable air mass flow measured value in the event of a flow direction reversal, the air mass flow ascertained by air mass flow sensor 8 when ambient air-pulsed valve 12 is opened is usually not suitable as information for the control of internal combustion engine 2 by engine control unit 10. In this case, a modeled substitute value for the air mass flow in air supply section 3 may be calculated by a suitable model of throttle valve 7.

The throttle valve model uses a standard equation for throttling to ascertain the air mass flow through throttle valve 7 on the basis of the pressure differential across throttle valve 7. The throttle valve model is usually adapted at operating points or in operating ranges in which air mass flow sensor 8 works properly, on the basis of the provided measured values of air mass flow sensor 8 in the known manner, i.e., by supplying a correction offset and/or a correction factor, so that in the event of a switch-over from providing the air mass flow information from the measured value to the modeled value, no jump occurs.

Alternatively, a substitute value for the air mass flow may be modeled via another model on the basis of the pressure in the intake manifold and of the rotational speed of the internal combustion engine. This other model may also be used for air systems without a throttle valve.

Figure 2:
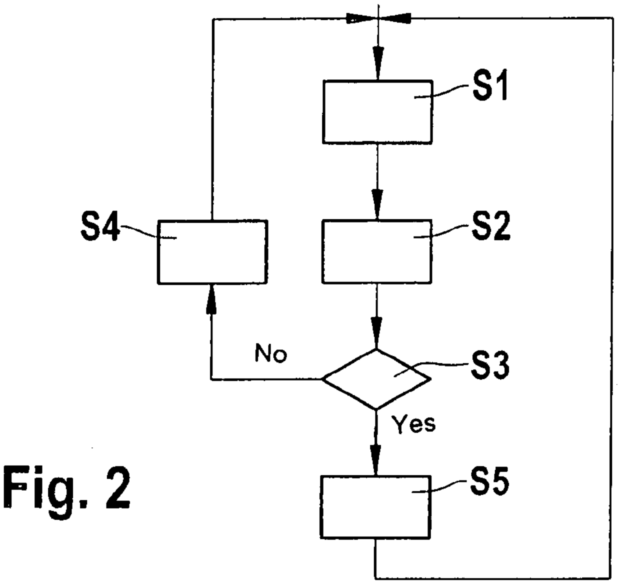
FIG. 2 shows a flow chart illustrating an example method for providing air mass flow information for the engine system of FIG. 1.

The method for providing the information about the air mass flow in engine control unit 10 is shown in FIG. 2 as a flow chart.

In step S1, the method starts with a state in which the air mass flow information is provided as a measured value by air mass flow sensor 8. While the air mass flow information is being provided, a sum of the mass flows across compressor 61 is modeled for a plausibility check of the mass flow information which is measured by air mass flow sensor 8. The sum of the air mass flows is modeled taking into account the air mass flow across the throttle valve, the volume V upstream from throttle valve 7. When modeling the sum of the air mass flows, compressor 61 and ambient air-pulsed pipe 11 are combined to form one unit and it is assumed that the air mass flow through this unit corresponds to the air mass flow through air mass flow sensor 8.

The air mass flow through the compressor system composed of compressor 61 and ambient air-pulsed pipe 11 is ascertained as follows:

$$m_v(n+1)=m_v(n)+\dot{m}_{compr}\Delta t-\dot{m}_{throttle}\Delta t$$

where the mass difference in the volume results in $$m_v(n+1)-m_v(n)=\dot{m}_{compr}\Delta t-\dot{m}_{throttle}\Delta t$$

where:

$$m_v(n+1)-m_v(n)=\frac{\Delta p\cdot V\cdot \Delta t}{r\cdot T}\Delta p$$

and $$\dot{m}_{throttle}=f(P_{upstrthrottlevalve}, P_{downstrthrottlevalve}, S_{throttlepositionvalve}).$$

Consequently, $$\dot{m}_{compr}=\frac{\Delta p\cdot V}{r\cdot T}+\dot{m}_{throttle}$$

where $m_v$ is the air mass in the volume between compressor 61 and throttle valve 7; $\dot{m}_{compr}$ is the air mass flow through compressor 61, $\dot{m}_{throttle}$ is the air mass flow through throttle valve 7, V is the volume between compressor 61 and throttle valve 7, Δp is the pressure differential between two consecutive cycles in volume V upstream from throttle valve 7, $P_{upstrthrottlevalve}$ is the pressure upstream from throttle valve 7 $P_{downstrthrottlevalve}$ is the pressure downstream from throttle valve 7, r is the gas constant, and T is the temperature in volume V. Pressure differential Δp may be ascertained by measuring the pressure in volume V and forming the difference.

For this purpose, in step S2, the measured quantities required for this computation such as temperature T in volume V upstream from throttle valve 7 and pressure p in volume V upstream from throttle valve 7 may be measured with the aid of a pressure sensor 13 and the modeled quantities such as air mass flow $\dot{m}_{throttle}$ across throttle valve 7 are provided for modeling the sum of the air mass flows.

If the above-described modeling of the air mass flows results in air mass flow in $\dot{m}_{compr}$ into compressor 61, i.e., the air mass flow which flows across air mass flow sensor 8, being smaller than a certain threshold value, which is established in step S3, (alternative: yes), then instead of the measured value for the air mass flow, the substitute value is used according to the throttle valve model in engine control unit 10 for further computation of the control quantities for internal combustion engine 2 (Step S5). The substitute value for the air mass flow results from the measured boost pressure, the modeled intake manifold pressure (downstream from throttle valve 7), and the position of throttle valve 7 set by engine control unit 10.

If the air mass flow is not less than the threshold value (alternative: no), then in step S4 the throttle valve model is adapted on the basis of the information provided by air mass flow sensor 8, i.e., the throttle valve model is adapted on the basis of the measured air mass flow, so that in the case of an invalid measured value of the air mass flow a substitute value with the highest possible accuracy may be provided. After the adaptation of the throttle valve model, the method jumps back to step S1, in which the measured value of air mass flow sensor 8 is retrieved again and provided as mass flow information.

The substitute value is computed in step S5 and the method then jumps back to step S2 to check again whether the operating state exists in which instead of the measured air mass flow information, the substitute value must be used for controlling internal combustion engine 2.

Figure 3:
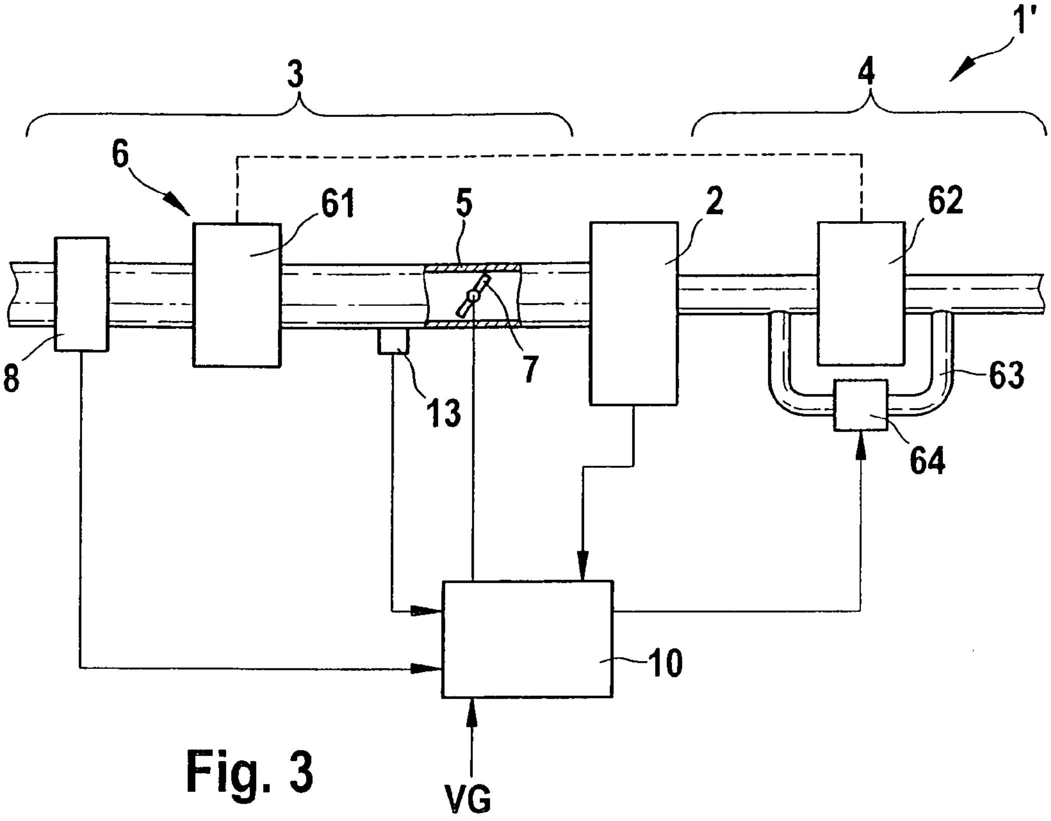
FIG. 3 schematically shows an engine system having a supercharger device without an ambient air-pulsed pipe.

FIG. 3 schematically shows another engine system 1', which ultimately differs from the engine system of FIG. 1 in that no ambient air-pulsed pipe connects the inlet side to the outlet side of compressor 61. This engine system 1' is designed so that compressor pumping is consciously taken into account in certain operating states. However, it must be established, with the aid of a plausibility check, whether the measured value of the mass flow information may be used or whether a substitute value must be used instead, namely when compressor pumping occurs.

Figure 4:
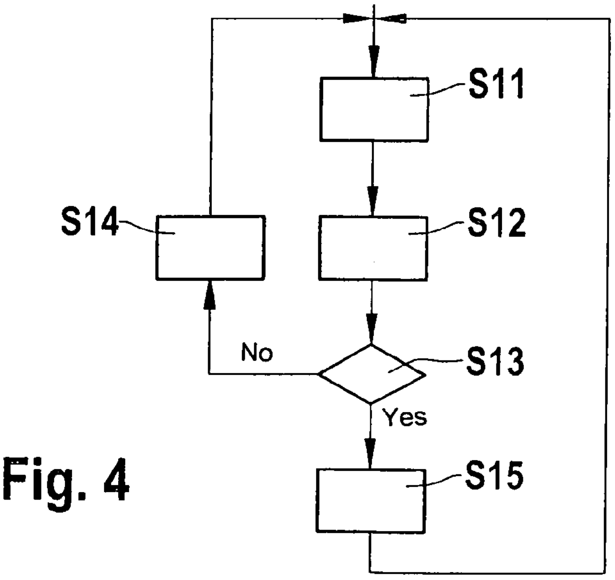
FIG. 4 shows a flow chart illustrating an example method for providing air mass flow information for the engine system of FIG. 3.

The corresponding method for providing the air mass flow information as a measured value or a substitute value is illustrated in the flow chart of FIG. 4. Initially the measured value of the mass flow information is provided in step S11. In step S12, the sum of the air mass flows across compressor 61 is modeled using the above-mentioned formula. In step S13, an operating state of engine system 1' is detected in which compressor pumping preferably or actually occurs. This may be accomplished, for example, by checking whether the measured information about the air mass flow across compressor 61 periodically drops below a threshold. In particular, it may already be determined whether this condition is met if the pressure gradient of the air pressure downstream from compressor 61, i.e., in volume V, has a periodic behavior. Another option is to determine whether a load change has occurred at a certain gradient, which makes compressor pumping likely.

If compressor pumping has been detected in step S13 (alternative: yes), then in step S15 the substitute value for the air mass flow is ascertained according to the throttle valve model on the basis of the pressures upstream and downstream from throttle valve 7 and of the information about the position of throttle valve 7. Subsequently, the method jumps back to step S11, in which the measured value for the air mass flow is detected and the sum of the air mass flows is modeled again to recognize when the measured value may be used instead of the substitute value. If it is established in step S13 that the periodic behavior of the air mass flow no longer exists (alternative: no), then the throttle valve model, which served as a basis for the computation of the substitute value, is adapted with the aid of the now available measured air mass flow information (step S14) and the method jumps back to step S11 of providing the measured value of the air mass flow.

The substitute value of the air mass flow when compressor pumping has been established may be provided if an ambient air-pulsed pipe exists and an erroneous state is detected in which ambient air-pulsed valve 12 may no longer be opened. In this case, even in an engine system in which compressor 61 has an ambient air-pulsed pipe, compressor pumping may occur, so that even in cases where ambient air-pulsed valve 12 is defective, engine control unit 10 may properly control internal combustion engine 2 with the aid of the substitute value for the air mass flow.

What is claimed is:

1. A method for providing a characteristic quantity for a state of an air system of a supercharged internal combustion engine for control of said engine, comprising:

detecting, with the aid of a sensor, an air mass flow in the air system, wherein the air system has a throttle valve downstream from a compressor of a supercharger device;

computing an air mass flow measured value from the sensor detected air mass flow;

providing an air mass flow model for computing an air mass flow value of the air mass flow through the compressor on the basis of an air mass flow through the throttle valve, taking into account dynamic behavior of a volume between the compressor and the throttle valve; and providing air mass flow information on the basis of one of the air mass flow measured value or the air mass flow model value, as a function of a state of the air system.

2. The method as recited in claim 1, wherein the air mass flow through the throttle valve is ascertained on the basis of a state of the throttle valve and a pressure differential across the throttle valve on the basis of a throttle equation, and wherein the dynamic behavior of the volume is taken into account with the aid of the ideal gas equation.

3. The method as recited in claim 1, wherein the state of the air system corresponds to a state in which a probability for erroneous detection of the air mass flow measured value exceeds a limiting value.

4. The method as recited in claim 3, wherein the air mass flow model value instead of the air mass flow measured value is provided as the air mass flow information if at least one of pulsation of the air mass flow through the compressor and pulsation of a pressure in the air system occurs.

5. The method as recited in claim 3, wherein the air mass flow model value instead of the air mass flow measured value is provided as the air mass flow information if at least one of (a) the throttle valve is closed at a gradient exceeding a specified gradient threshold value, and (b) the air mass flow measured value drops below a specified threshold value.

6. A device for providing an air mass flow for a state of an air system of a supercharged internal combustion engine for control of said engine, comprising:

an air mass flow sensor configured to detect an air mass flow measured value in the air system having a throttle valve downstream from a compressor of a supercharger device, and a computing unit configured to:

(a) implement an air mass flow model and (b) provide air mass flow information on the basis of one of the air mass flow measured value or an air mass flow model value computed on the basis of an air mass flow through the throttle valve, taking into account dynamic behavior of a volume between the compressor and the throttle valve, as a function of the state of the air system.

* * * * *